United States Patent Office 2,989,778
Patented June 27, 1961

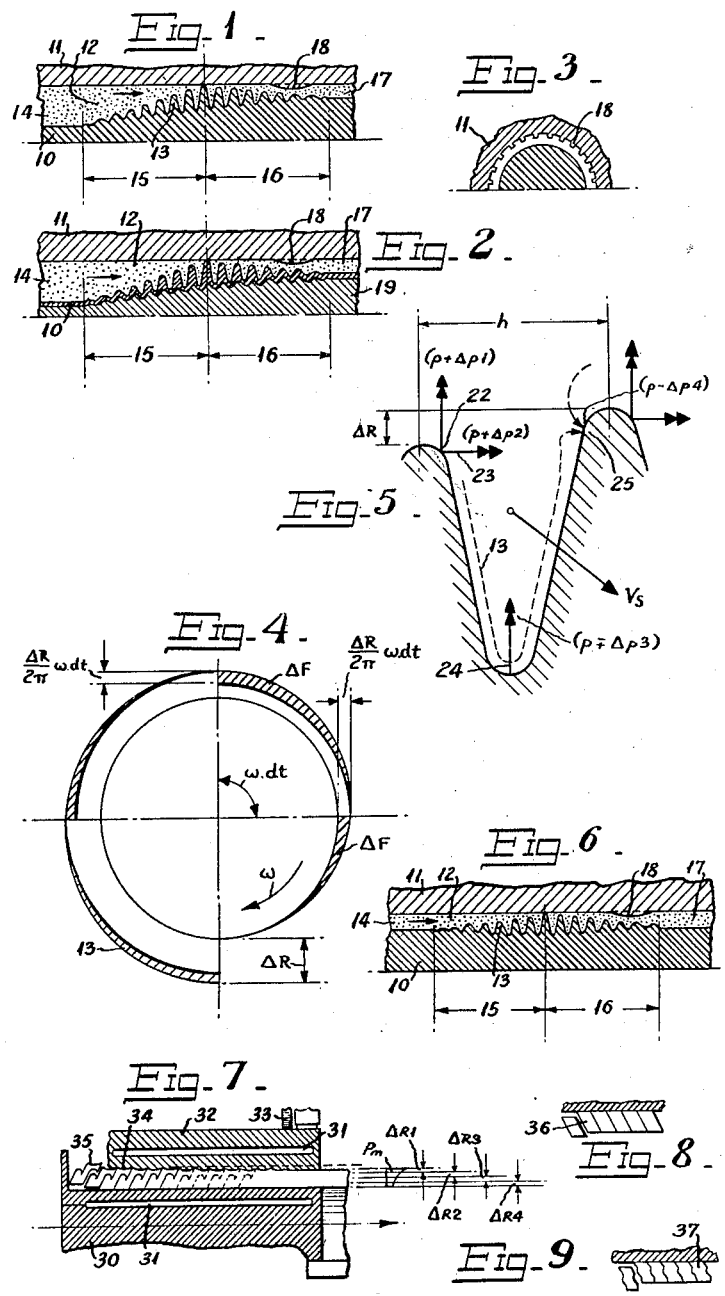

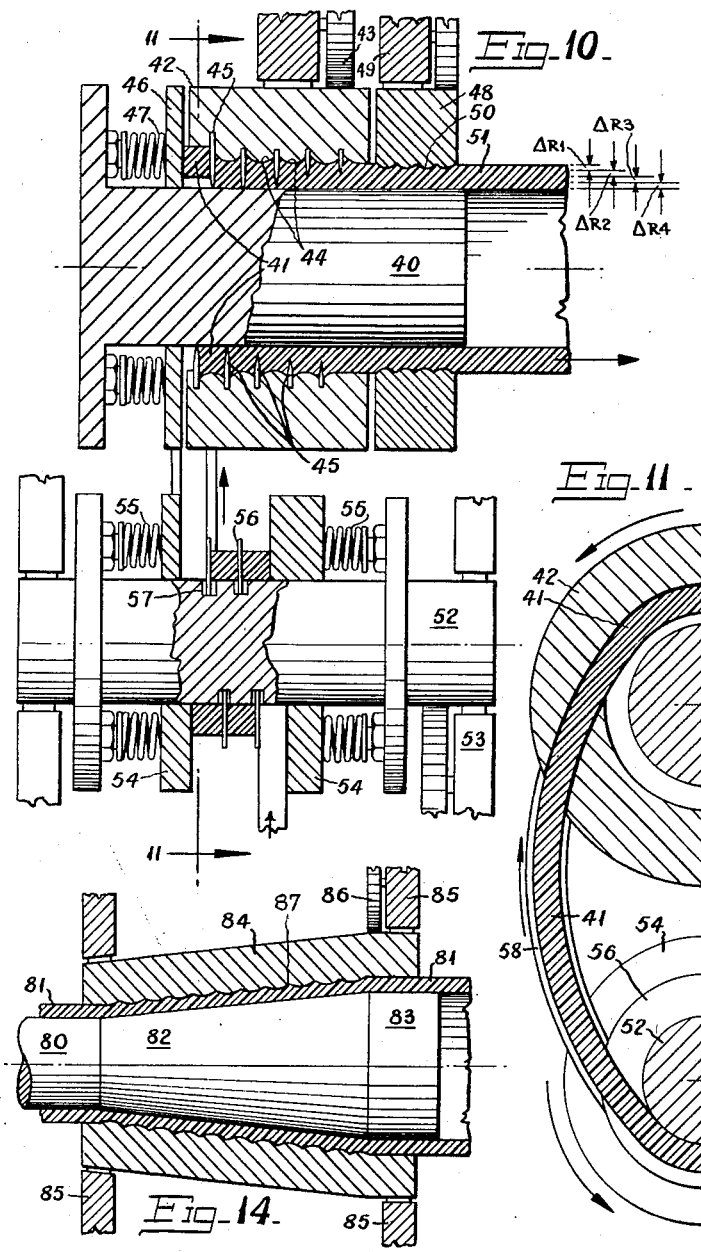

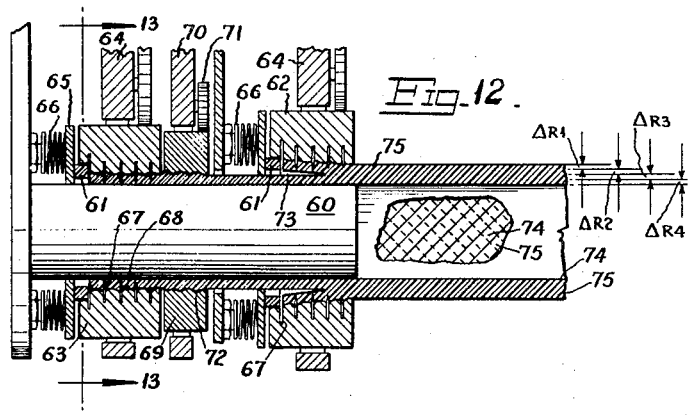
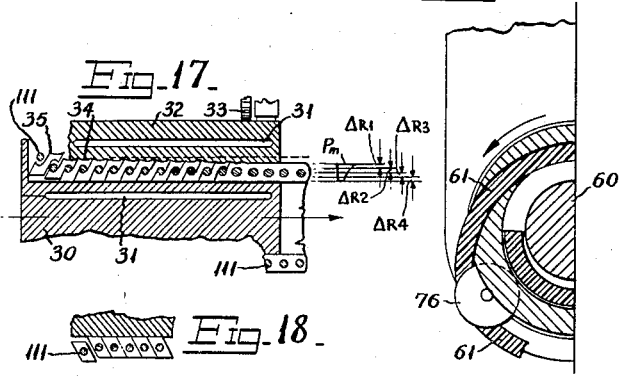

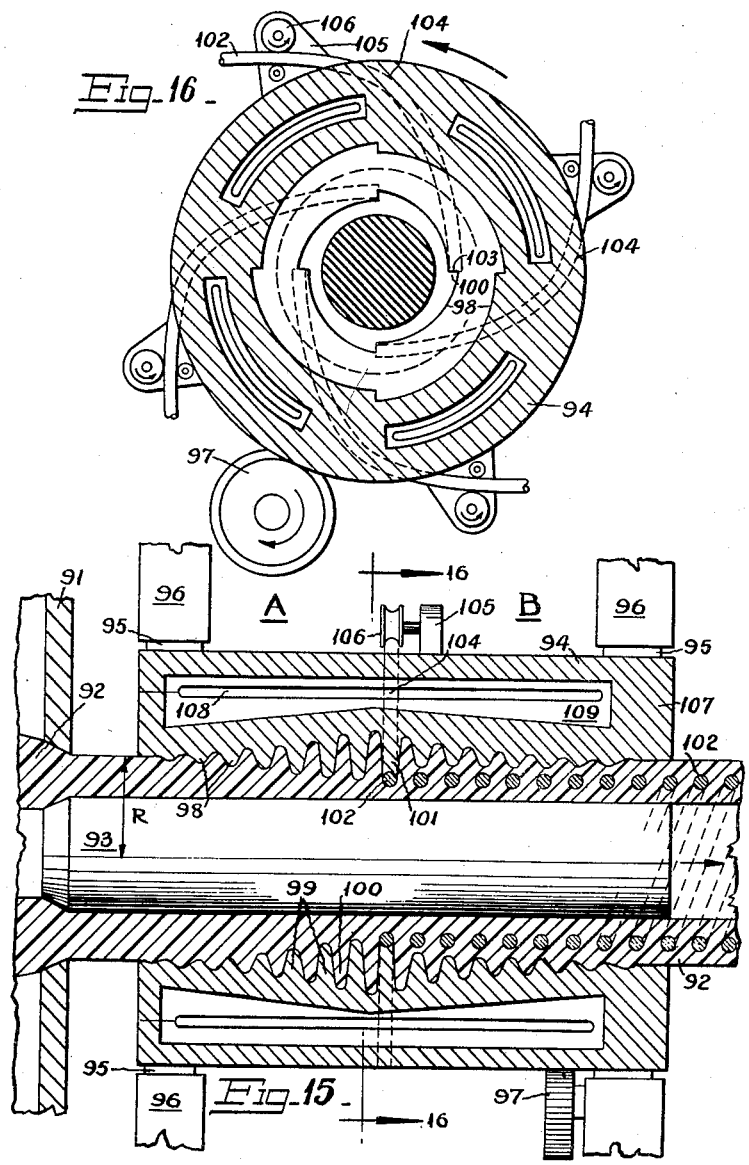

2,989,778
MEANS FOR MAKING STRENGTHENED PIPE FROM DRAWABLE MATERIAL
Meyer Schlioma Frenkel, London, England, assignor to Frenkel C-D Aktiengesellschaft, Vaduz, Liechtenstein, a company of Liechtenstein
Filed Feb. 11, 1955, Ser. No. 487,517
13 Claims. (Cl. 18—14)

The use in industry of pipes and other articles made of plastics is increasing steadily owing to the numerous advantages of plastic pipes and other articles over, for example, pipes or other articles made of metals.

The main disadvantage of plastic pipes has been their lack of strength compared with metal pipes, and the tendency of many plastic materials to deform or cold-flow under load, so that it has not been possible for example to use plastic pipes for conveying fluids under high or medium pressures.

However, conventional methods and machinery for making pipes and other articles from plastics or other materials in the plastic state generally treat the materials in bulk, so that there are considerable differences in the treatment, and hence in the properties of elements of the material at different positions in the wall of such a pipe or other article.

Accordingly, it is an object of the present invention to provide strengthening of substantially all elements of the material by utilization of inherent properties of the material, particularly in the case of many plastics, instead of leaving these unutilized, as with conventional methods.

It is further object of the invention to effect thorough bonding (joining) of the elements of the material with every adjacent element, to eliminate weak spots due to this cause in conventional methods.

It is a further object of the invention to provide methods and means for reinforcing a pipe or other article beyond the maximum strength obtainable by treating the material itself, through combination of such material with mechanically stronger materials.

Within the objects already stated, the present invention has a number of further objects in view of the following facts:

In the manufacture of pipes and other articles from various materials, and particularly certain plastics, no use is made of the fact that these are very greatly improved in their tensile strength by operations such as drawing, stretching, calendering, and the like (as hereafter covered by the term "drawing" as generic expression), an effect accounted for on the hypothesis of stretching and orientation of macromolecules.

It is therefore a further object of this invention to make use of this property for the strengthening of pipes or other articles either generally against any type of loading, or in a particular direction or particular directions against a prevailing stress, such as for example the "hoop-stress" due to internal pressure in a pipe.

It is a further object of this invention to utilize the above fact for the reduction or elimination of the considerable cold-flow (or creep, extension under constant load) which many plastic materials are subject to.

It is a further object of this invention to provide a method of and means for manufacturing pipes and other articles consisting of homogenized and unidirectionally or multidirectionally strengthened material from unstrengthened bulk material for example by new screw-type apparatus.

It is a further object of this invention to provide methods of and means for manufacturing pipes or other articles consisting of homogenized and unidirectionally or multidirectionally strengthened material from preformed strengthened strips.

It is a further object of the invention to provide methods of and apparatus for the production of pipes and other articles of considerably increased strengths (hoop or longitudinal strength or both) as compared with a pipe of the same dimensions (wall-thickness and diameter) produced from the same material by conventional methods, in order to open up new ranges of application for which these materials were too weak with conventional methods of manufacture, such as making pipes for conduiting under pressure.

It is a further object of the invention to provide methods and means for making such strengthened pipes in any required large diameter, i.e. to transcend any limitations of conventional methods in that direction.

It is a further object of the invention to provide methods and machinery for making such pipes continuously and in long lengths.

It is a further object of the invention to provide methods and machinery to enable the speed of manufacture of pipes and other articles to be increased compared to conventional methods.

It is a further object of the invention to provide machinery for the manufacture of such pipes or other articles, which can be adapted to the production of long lengths of piping on site, and which can be made mobile for example for mounting on a tractor.

It is a further object of the invention to provide methods and machinery for continuous friction welding.

To carry these objects into effect, the present invention provides: In and for an apparatus for making continuously a strengthened pipe from preformed drawable material, a first component, a second component surrounding the said first component, the said components having operating surfaces facing one another and defining a substantially annular passage between them, and induction-means for introducing the said material, at least in part in the shape of a strip-element, at one end of the said passage and for arranging the said strip-element helically in the said passage, an outlet means at the other end of the said passage, a means for rotating one of the said components about an axis central to the said passage, the said other component being non-rotatable, the said rotatable component having on its operative surface a helical thread with a radial clearance between its tip and the facing operating surface of the said non-rotating component, for working and transporting the said material along the said passage; the said thread comprising a main section in which the mean radial depth of the said passage and the radial depth of the said thread continuously decrease along the direction of transport and in which the said radial clearance continuously increases in the direction of transport; for combining the adjacent side-surfaces of the said strip-element progressively in the radial and circumferential directions.

In such apparatus, the radial depth of the said helical thread in the said main section may reduce continuously to zero and at least one of the thread-characteristics of pitch, mean diameter and profile form may change continuously.

The said induction-means may comprise a section of the said helical thread preceding the said main section, in which the radial depth of the said helical thread increases continuously from zero value to a maximum value along the direction of transport, and the said radial clearance decreases from a maximum to a minimum value.

The said rotatable component may further comprise a channel ending at the tip of a thread of predetermined radial depth, and means for continuously introducing through the said channel into the said annular passage an elongated and windable reinforcement, for being incorporated in helical arrangement at a predetermined depth in the wall of the said strengthened pipe.

The said induction-means may comprise a guide-means mounted on the said rotatable component for feeding the said strip into the said helical thread in the said annular passage, and the said helical thread may consist, at least in part, of a thin sheet tipped by a knife-edge. The said induction-means may further comprise means for preheating at least the side-surfaces of the said strip, the said preheating means comprising a rotary member, means for rotating the said rotary member, friction discs mounted on the said rotary member, means for rotating the said discs with the said rotary member and permitting axial movement of the said discs on the said rotary member, means for providing an elastic pressure on the said discs towards one another and means for passing the said strip between the said discs under pressure at least at its side-surfaces.

Such a preheating means may comprise a rotary shaft, means for rotating the said shaft with the said rotatable component, an elastic helical rubbing sheet, a mounting for the said sheet on the said shaft for rotating the said sheet with the said shaft and for permitting axial movement thereof relative to the said shaft, means for applying an elastic pressure in opposite axial directions on the ends of the said helical sheet, for the said strip to pass through the helical thread formed by the said sheet under axial pressure at its side-surfaces and a means for adjusting the said axial pressure.

Furthermore two such apparatus may be arranged in sequence to make a second layer of preformed drawable material on top of a first layer, with the strip-elements having different direction in the said two layers.

Such induction-means may comprise a guide-means mounted on the said rotatable component, for feeding the said strip into the said helical thread in the said annular passage, and a second guide-means for feeding an elongated and windable reinforcement into the space between adjacent side-surfaces of strip-elements, the cross-section shape of the said strip comprising a recess for taking up the said reinforcement.

The said non-rotating component may comprise longitudinal ribs near the end of the said main section though still within it, which ribs extend into the said annular passage to prevent twisting of the strengthened pipe.

The invention will now be described by way of example and in some detail with reference to the accompanying drawings in which:

FIGURE 1 is a longitudinal section of the upper half of one embodiment of the invention, providing the differentiating action from bulk material, working, and integrating action in one machine;

FIGURE 2 is a similar section showing an alternative design of mandrel of this first embodiment;

FIGURE 3 is a fragmentary cross-section on the line 3—3 of FIGURE 1;

FIGURE 4 is a cross-section of the mandrel shown in FIGURE 1;

FIGURE 5 is an enlarged section of one portion of the helical rib or thread on the mandrel;

FIGURE 6 is a section similar to FIGURE 1 showing another form of mandrel of substantially uniform mean diameter for said first embodiment;

FIGURE 7 is a fragmentary longitudinal section of a second embodiment of means for making a pipe from material in the form of preformed strip;

FIGURES 8 and 9 are sections through preformed strip of alternative cross-sectional shapes; for use in FIGURE 7;

FIGURES 10 and 11 are a sectional front and side elevation respectively of a third embodiment of the invention, of means for working and for preparing for friction welding strip material, and for making of a pipe of preformed strip with friction welding machinery;

FIGURES 12 and 13 are a sectional front and side elevation of an alternative version of this third embodiment of the invention, adapted for the friction welding of layers of drawn strip on top of one another;

FIGURE 14 is a section through a further means for working a layer of material;

FIGURES 15 and 16 are a sectional front and side elevation of a further embodiment similar for the first one but adapted to introduce a reinforcement into the material of the pipe;

FIGURE 17 is a fragmentary longitudinal section through the second embodiment shown in FIGURE 7, but adapted to introduce a reinforcement as well as the material in the form of drawn strip;

FIGURE 18 is a section through preformed strip incorporating a reinforcement, for use in the machine of FIGURE 17.

FIGURES 1–5 show embodiments of the invention directly applicable to production of tubes, or as extruder screw components, the embodiment carrying out the generic process of differentiation working integration as hereinafter described.

In the apparatus of FIGURES 1–5, 10 is a mandrel which is rotated about its axis by any convenient means within the stationary cylindrical shell or sleeve 11. The mandrel is tapered in mean diameter, with its smallest diameter at the entry-end 14 where plastic material 12 is fed into the annular space between the mandrel and the sleeve. The plastic material is carried along and worked upon a helical rib or thread 13 on the surface of the mandrel. This is a four-start thread of varying radial depth, pitch-circle diameter, pitch and profile shape, starting from zero depth at the entry 14 from the cylindrical surface of the first part of the mandrel and increasing in radial depth as well as in mean diameter throughout the expanding section 15 up to a maximum at which the deepest portion 21 of the thread is substantially equal in diameter to the internal diameter of the shell or sleeve 11. The depth of the thread is then progressively reduced throughout the reducing section 16, with the mean diameter remaining substantially constant or increasing only at a smaller rate than in the expanding section, until the depth of thread reaches zero at the exit end 17, where the thread merges into another smooth cylindrical portion of the mandrel.

Internal longitudinal ribs 18 of relatively short axial lengths are provided on the inner surface of the shell or sleeve as shown in FIGS. 1 and 3, to prevent the material from rotating with the mandrel at the exit end 17.

Passages 19 may be provided in the shell or sleeve or in the mandrel or in both for the circulation of steam or another heating fluid. The mandrel shown in FIG. 2 is made hollow at 19 for the circulation of such fluid. Alternatively the shell or sleeve or both may be heated electrically as indicated at 20.

Ventilating means for allowing egress of air or other gases liberated during working may be provided at a suitable position or positions in the shell.

In operation, the plastic mass 12 which may, depending on the nature of the material and the conditions of its working be in states of plasticity near solid, is peeled off in extremely thin layers (see dotted cross-sectional areas ΔF on FIGURE 4) by the thread increasing in radial depth in the expanding section 15, until at the maximum depth of thread 21 the whole of the plastic mass has been so differentiated into such thin layers. These layers are then worked under considerably increased compression in all directions, folded into the grooves between the threads, stretched in substantially helical directions under these pressures, to provide increased strength and uniformity of the plastic, as described more precisely hereafter. In the reducing section 16 of the mandrel, these layers are progressively integrated into while still being worked under compression, into a considerably strengthened and homogenized bulk of material, in which an amount of orientation of the elements in helical directions depending on the general design of the thread has been achieved. Accordingly, the method of differentiating the material into elements (thin layers), working these individually under compression and reintegrating these with orientation of the elements while continuing to work them, is carried out in the apparatus of this embodiment. The homogenized and strengthened material may be utilized directly to form a pipe or, when the embodiment forms part of an extruder also applicable for other extruded sections, may be led onto the extrusion head, after the process of this invention has been carried out by the embodiment described.

The action of the present embodiment will be understood more precisely with reference to the enlarged details of FIGURES 4 and 5: the indentation of the spiral thread in the expanding section 15 into the plastic deepens radially at the rate of $$\frac{\Delta R}{2\pi} \cdot \omega = \theta_R$$

with $\omega$ the angular velocity of the screw and R the increase in external diameter per turn. This causes, by a kind of squeezing action of the expanding thread towards the surface of the shell, an increase $p_1$ in the plastic material at position 22 FIG. 5, in the radial direction. At the same time, thin layers of cross-sectional area $\Delta F$ (see FIG. 4) are peeled off at positions 23 and are given the axial velocity $v_t$ of the thread, which, on account of the forward velocity of the plastic mass being smaller, causes a further squeezing action in the axial direction giving rise to an increase of pressure by $p_2$ in the axial direction at position 23 (see double arrows for pressure increases).

Hence the peeled-off layer is worked under increased compression $(p+\Delta p_1)$ in the radial direction and $(p+\Delta p_2)$ in the axial direction, both these increases being considerable. Furthermore, on account of the bottom of the groove 24 moving radially outwards, there is there a squeezing action producing an increase of pressure $\Delta p_3$, and owing to the back of the thread at 25 moving forward away from the more slowly moving mass of plastic, there is there a suction effect producing a reduction in pressure of $\Delta p_4$, as indicated. These effects produce, in addition to helical motion of the plastic in the thread-groove with velocity vector $v_s$ as indicated, during which the plastic is stretched helically under pressure, a slow rotation (circulation) about the vector-axis $v_s$ within each groove, as indicated on FIG. 5.

Thus, the thin layers of plastic are gradually peeled off, worked and stretched helically under continually increasing pressure and are made to pass through grooves of different forms while being rotated in these grooves at the same time. These layers are thus worked and compressed by many different forces which change both in magnitude and direction according to the successive alterations of the forms of the grooves, which are designed in accordance with the requirements for the material in question to produce the improved strength and uniformity of the material.

In the expanding section 15 of the version shown in FIG. 6, which differs from that of FIGURES 1 and 2 in that the mean diameter only expands very slightly, the action is analogous, except in that owing to the bottoms of the grooves 24 (FIG. 5) receding there is there also a suction effect which aids the circulation.

For both the examples, the processes reverse to some extent in the reducing section 16, following the maximum diameter thread 21 which is substantially in contact with the wall to prevent any plastic passing through unworked. The elementary layers are now unwound by the helical threads gradually reducing in depth, now causing an increase of pressure by the squeezing-effect of the bottoms of the grooves approaching the wall of the shell. The helical velocity components being brought to zero by the axial ribs 18 further serve to increase the compression, as the inner layers come into contact with the already non-rotating outer layers. Furthermore, each thin layer, as it is unwound, is further stretched by its cohesion with the material still in the groove. Thus, in the reducing section 16, all the layers of the material which have been peeled off and worked individually under pressure in the expanding section 15, are unwound (integrated) and further stretched and oriented in the reducing section 16. In this way, the embodiments shown operate to increase considerably the strength of the plastic by working (stretching and orientation) and by improving the uniformity of the material, eliminating weak spots which otherwise serve to limit the strength of the whole product.

It will be understood that the optimum effect of all the factors enumerated depends on the relations of the characteristic properties of the thread, and the changes of these characteristics radial depth, pitch, pitch circle diameter, profile shape, length of expanding and reducing sections, possible changes of diameter of the shell, and the like, which have to be designed for mathematically in accordance with the properties of the materials, the particular results aimed at, and the like.

From the point of view of heat input, these embodiments have great advantages in that they off very large areas of heat transferring surface from metal to the plastic material, and also provide for each layer of the material to contact the walls in rotation.

However, in preferred embodiments of the invention, no heating appliances in the mandrel or shell are provided, it being preferable to provide the required heat input by mechanical work only, for which again this construction has particular advantages since all of the material is worked in substantially uniform fashion in the form of the thin layers. This further allows self-regulation of the working process carried out in the apparatus, because the achievement of a certain consistency of the material (in the extreme case melting) will make itself felt in the torque required for driving the screw, and in the fluctuation of speed resulting from this change of torque. This can accordingly be utilized to govern the machine to provide consistency of high quality output.

FIGURE 7 shows another embodiment of the invention for making a pipe from preformed and drawn strip of plastic or other material in the plastic state, carrying out the method of differentiating-working-integrating of elements as described hereinafter.

In FIGURE 7, 30 is a stationary cylindrical mandrel provided with passages 31 for a heating fluid, or for an electric heating element. An outer ring member 32 is rotated about the mandrel by any convenient means such as the gearing indicated at 33, and is also provided with passages 31, or electric elements 31, for heating.

The bore of the ring-member is tapered and is provided with a shallow screw thread 34, which diminishes in radial depth towards the end of the bore of less diameter, where it fades out in a smooth cylindrical surface. A preformed and drawn plastic strip 35 is wound helically onto the mandrel by a winding mechanism which may or may not form part of the rotating ring-member at its entry. The preformed and drawn strip is of such cross-sectional shape as to facilitate welding under the pressure exerted by the rotating ring-tool, for example the substantially Z-cross-section indicated for strip 35.

The rotating ring-member 32 forces the strip axially along the surface of the mandrel, in a preferred embodiment a spring-loaded back-plate such as shown for the following embodiment of FIGURE 10 is provided to keep up the axial compression from the entry, and at the same time the ring-member compresses the strip both radially and axially. This is due to the thread being designed with such variations in radial depth, pitch, pitch circle diameter and profile shape as to produce the necessary magnitudes and directions of pressure forces in the radial, axial and circumferential directions. The strip is heated by contact with the mandrel and the ring-member, and as it passes between them, it is stretched and drawn to some extent under compression while the edges of adjacent sections of strip are welded together under this working and compression, so that a complete pipe issues from the small end of the apparatus.

The contacting edges of the strip may be preworked before the strip is wound onto the mandrel, in order to facilitate the welding of them together. For example, the strip may be passed through to the rollers which indent and soften the edges of the strip, or preheating means as described for the following embodiment, using friction heating, may be applied.

FIGURES 8 and 9 show alternative cross-sectional shapes of preformed and drawn strip for use in the apparatus of FIGURE 7.

This example represents an embodiment of the generic method and apparatus of the invention in several ways, as follows:

On entering the rotating ring tool 32, the strips are differentially worked as elements and integrated, the elements being of radial depth R, as indicated on FIG. 7.

Initially, when on entry into the ring-tool radial pressure is applied to the strip by the thread, the pressure-distribution in depth is somewhat as indicated on the small graph sketched on FIGURE 7. The pressure falls off from a maximum value $P_m$ at the outside surface, on account of the elastic compression effect which is connected with a certain displacement and which operates on elements of depth $\Delta R$, which may each be considered as an elementary spring, subject to friction at its edges adjoining the adjacent strips.

However, on continually progressing into the helix, the maximum pressure becomes that at which welding will take place, and will then penetrate successively and layer by layer right through the depth of the pipe-wall to the mandrel.

This machine, unlike an extruder for plastics, can be made to work at very fast speeds of production of pipe, and owing to its simplicity and lightness can be mounted on a tractor, say, to produce continuous lengths of tubing on site, from preformed and drawn strip fed from drums, say. On account of the preformed strip having been subjected to drawing operations which can bring its tensile strength up to the limit obtainable through stretching and orientation of the macro-molecules, which is a multiple of its undrawn strength for certain plastics particularly, this apparatus produces a pipe which is stronger against hoop-stress than an ordinary extruded pipe at least in the ratio of the tensile strengths of the drawn to the undrawn strip, besides being much less subject to cold-flow. This is most important in pipes which have to withstand high internal pressures, and accordingly this embodiment of the method of pipe-production according to the present invention opens up whole ranges of application for conduiting pipes for certain plastic materials which with conventional manufacturing methods were too weak to withstand the pressures involved, because it enables so much stronger pipes to be made from the same wall-thickness of the same material. Alternatively, substantial savings in material and other costs can be achieved by using with this method a smaller amount of the same material than was required with conventional manufacturing methods to withstand a given lower pressure.

It will be understood that the embodiment of FIGURE 7 will be effective for a certain range of materials, and may require preheating at the edges to be welded, or right through the strip. With the heating provision shown and the thread being able to exert very high required pressures in various directions, the apparatus can be adapted for curing of a plastic material at the same time as making the pipe according to the method described, heat input being either from the elements, and/or from mechanical working, and/or from radiant bulk-heating sources.

FIGS. 10 and 11 show another embodiment of the invention for making a pipe from preformed and drawn strip of plastic or other material in the plastic state with the aid of friction welding of the strips, this embodiment carrying out the method of differentiating-working-integrating of elements as described hereafter.

In FIGURE 10, 40 is a stationary mandrel upon which the preformed and drawn strip 41 is wound by the ring-tool 42, which is rotated in any suitable manner, for example by the gearing 43. The ring-tool is provided internally with a shallow thread 44, of reducing radial depth and reducing pitch circle diameter, and other properties as described later, in which further is mounted a helical rubbing member 45 in the form of a helical knife edge penetrating the spaces between adjacent strips. At the entry-side, a back-plate 46 which is spring loaded by an adjustable spring means 47, serves to push the strip with a required axial pressure. This serves to maintain the axial pressure on the strip in spite of small variations in width which may occur on the preformed plastic strips.

The rubbing components 45, as shown, start off by penetrating right through the depth of the plastic strip, ending in the mandrel 40, and continue in this fashion for such length as is required to produce a sufficient degree of friction heating of the edges to be welded, this being designed for in connection with the speed of rotation, the pressure between the edge-surfaces and the rubbing component which depends on the design of thread, and the rubbing properties of the plastic and of the rubbing component. When the conditions for welding have been brought about on the edge-surfaces of the strip, the rubbing components gradually reduce in depth, producing a gradual withdrawal of the knife-edge while at the same time the thread changes to push the edges together under welding pressure, which occurs just below the knife-edges without allowing access to air which would harm the welding process. This reduction of the rubbing members 45 continues until they finally recede into the outer ring-tool, when the weld will extend through the whole wall-thickness, integration of differentials from zero to total wall-thickness.

In this example there is shown following the friction welding member a separate ring-tool 48, mounted and rotated at 49, by some suitable gearing. This additional ring-tool may be required, depending on the friction-welding and other properties of the material used, to further working of the material to bring the welds up to full strength, if that is not already the case from their treatment in the friction welding tool. Alternatively or additionally, the additional ring-tool may be required for moving the pipe formed forward on the mandrel, or for exerting a resistance in order to maintain the axial back-pressure on the friction welding tool. For these purposes this additional ring tool is provided with an internal thread 50 which is designed for the one or the other or for a combination of the above purposes. In fact, it may be advantageous both from the point of view of exerting additional pressure across the welds, from the point of view of working the material, and from the point of view of neutralizing the torque exerted by the friction welding tool on the pipe itself, to have this additional tool rotate in the opposite direction to the friction welding tool.

In view of the fact that the speed of the rubbing friction between the friction components 45 and the edges of the strip 41 is necessarily limited by the speed of the winding mechanism for the strip, which speed may be insufficient for certain materials to get up the heat for friction welding, or may require too long a length of ring-tool 42 to bring this about, thus allowing too much time for unwanted penetration of heat into the strip, a working and preheating unit for the strip is also shown on FIGURES 10 and 11. This comprises a shaft 52, rotatably mounted at 53, over which the strip 41 passes between the axially movable end-pieces 54, loaded by the adjustable spring means 55. On the shaft 52 there is mounted between these end-pieces a helical sheet of metal or of other suitable material in such a way as to be rotatable with the shaft, but axially movable relative thereto, and this separates the edges to be welded of the strip 41.

Furthermore, depending on the properties of the material being used, which may include some not easily bendable varieties, this preheating unit can carry out the then very important function of gradually giving the strip the required curvature for feeding into the friction welding unit. For this purpose, the shaft 52 may be tapered, with the big end at the entry-end for the strip, and the small-end at the exit. Alternatively, several preheating units may be applied for this purpose.

The preheated strip is guided to the welding unit in passage 58, the walls of which may be heat insulated or even heated to keep up the temperature produced in the edge-surfaces to be welded.

The embodiment of preheater shown is intended for a material requiring relatively a great deal of high-speed rubbing contact for effective preheating. For many cases, however, a much simplified unit consisting essentially of two spring-loaded friction discs rotated at high speed and between which the strip is passed, would be sufficient. Such a simplified embodiment is indicated on the following example of friction welding machinery.

This example represents an embodiment of the generic method and apparatus according to the invention in several ways, as follows:

In the friction welding apparatus, the strips are differentially worked and integrated with respect to elements of thickness of the strip $\Delta R$ (see elements $\Delta R_1$, $\Delta R_2$, $\Delta R_3$, indicated diagrammatically by way of example), since on account of the gradual withdrawal of the rubbing components 45 the working and welding takes place on these elementary strips of thickness $\Delta R$, with the integration. The integration is completed with further working, if required, in the following unit having rotating ring-tool 49.

The embodiment of the invention incorporating friction welding may, in certain circumstances have considerable advantages over the preceding embodiments, since in friction welding only the actual edges to be welded are heated up, and hence the speed of manufacture is not bound by any such factors as time-lags for cooling down or for solidification, and such factors are possible shrinking distortion and the like with change of temperature do not have to be taken into account.

Furthermore, with the method of manufacture from strip, there is no limitation on diameter of piping, the rotating tool being capable of being made up in sections, or alternatively not having to be a complete ring-tool to be an outer member capable of fulfilling the functions required by the friction welding apparatus.

With the method applied to produce multi-layer pipes from strip, each layer being made individually and being wound to resist prevailing stresses in a particular direction or directions, pipes of very great strength in ratio to the amount of material used are capable of being made by the method and apparatus according to the present invention.

FIGURES 12 and 13 show another version of the embodiment shown in FIGURES 10 and 11, adapted for the production of a pipe with two layers respectively made up from preformed strip according to the present invention. Apparatus according to this example can be provided, of course, to produce any required number of layers of strip, with different helical orientations of drawn strip to take up most effectively various combinations of prevailing stresses, or to provide effective structures against fluctuation of loading between various types of load.

In FIGURES 12 and 13, the preformed and drawn strip 61 is wound onto the mandrel 60 by the ring-tool 63, which is mounted and driven by some convenient means 64, indicated as a gearing. The back-plate 65, loaded by the adjustable spring means 66 exerts a required axial pressure on the strip entering the ring-tool.

The metallic or other rubbing components 67 are arranged within the thread 68, substantially as described for the preceding example, except that in this case a two-start thread and hence also a two-start helical rubbing component is indicated. The thread, in this case, again is designed with the radial depth, pitch, pitch circle diameter and profile shape varying along the length of the ring-tool according to design for the properties of the plastic material and other factors, and the rubbing knife-edges withdrawing gradually.

Following the welding ring tool is shown a transporting and further working ring-tool 69, which is rotatably mounted at 70 and driven by suitable means such as the gearing 71. Its thread 72, having one or more of the characteristics of radial depth, pitch, pitch circle diameter and profile shape varying along its length, will be designed to fulfil one or the other or required combinations of the following purposes:

(a) Additional working of the material, particularly, if required, across the welds to bring these up to full strength, if owing to the nature of the plastic and the process this has not yet been achieved in the preceding ring-tool.

(b) To aid in transporting the pipe layer 74 formed in the machinery so far against the frictional resistances of the mandrel.

(c) If required, to provide an axial back-pressure to maintain the pressure in the welding ring-tool 63.

(d) To produce further working of the material, if required.

(e) To neutralize the torsional moment on the pipe exerted by the rotating welding tool 63.

In carrying out one or other or combinations of these functions, this ring-tool may well be rotated in the opposite direction to the rotation of the welding ring tool, and have a helical thread cutting across the helical thread of the ring-tool.

Following this unit, there is a corresponding winding and friction welding tool for putting a second layer of strips onto the first layer, which now acts as a mandrel. The ring-tool is substantially similar to the first unit, like numerals denoting like parts, and may again be followed by a working, transporting and the like tool, which is not shown here. The differences to the first welding unit are in the design of the thread, which in most cases will produce a different helical arrangement of the strip in the second to that in the first layer, often wound in the opposite direction, against a different kind of stress. A structural difference from the first unit is that the first helical turn of the friction rubbing sheet is turned in the axial direction, forming a rubbing sheet 73 to produce friction welding between the two layers by rubbing against both of them under the pressure produced by the design of the screw thread, and by tapering off into a knife-edge after a sufficient length of rubbing surface has brought the edges to a state for effective welding.

It will be understood that with this embodiment preheating and preworking apparatus as shown on the example of FIGURES 10 and 11 may be used with each unit. For materials requiring less preheating, a simple version of such a preheater consisting essentially of two spring-loaded friction discs rotated at high-speed, and mounted directly on the ring-tool for the strip to pass between the friction discs just before being wound on the mandrel, will suffice. Such a unit is indicated at 76 on FIGURE 13.

The opened-up section of the pipe-wall on FIGURE 12 indicates the strips 74 and 75 in the internal and external layer respectively being oriented at an angle $0 < \psi < 180°$ relative to one another, the helices being of reverse sense of rotation. With regard to the friction welding of the strip of the outer layer onto the inner layer, it will be seen that the inner surface of the outer layer is preheated by a preheater as shown on FIGURE 10 through its contact with the rotating shaft of the preheater, this preheating being just as much as that given to the side-edges since the relative velocity of rubbing is as large, and the radial pressure between strip and shaft is large in any case, on account of the large tension.

The outer surface of the inner layer is, of course, thoroughly preheated by the working it is given by the welding tool and the following tool.

In this way, in such a two or multi-layer pipe produced by apparatus according to this invention:

(1) Not only the side-edges of the strips, but also the inner and outer edge-surfaces of the strips are friction-welded to their adjacent strips.

(2) A more important factor in the cohesion between the two layers is brought about by the tension in winding the strips, under total tension $S.e^{\mu(\phi_1+\phi_2)}$, S being the initial tension and $\phi_1$ the total angle in the preheater and $\phi_2$ the total angle of contact of the strip in the welding tool. This is the sum (integral) of the continuous differential increases in tension (and hence in radial pressure) $S.e^{\mu d\phi}$ throughout the passage of the strip through the preheater and welding tool. This produces a preload in tension in the outer layer, and a preload in compression in the inner layer, with the radial pressure corresponding to this tension between them.

This leads to a considerable increase in the mutual cohesion between the two layers, and also between the side-edges of adjacent layers, beyond that produced by the welding.

(3) Since the strips in adjacent layers cross at an angle $\psi$ (between 0 and 180°), this leads to a further increase in cohesion, and apart from this to an increase in cohesion in all directions, axial and radial, beyond the increase in cohesion as described under point (2) above.

(4) The factors described in the above three points lead to a considerable increase in the resistance of the pipe against load, which on account of the different orientations of the helically wound strengthened strips in the different layers operates in all directions.

This shows the considerable advantages of a pipe made up of at least two layers of strip, as described above, in comparison to a pipe of the same wall-thickness consisting of only one layer of strip of the of the same thickness as the two layers of the first pipe, not to speak, of course, of the improvement of even the one-layer pipe made up of strip over a pipe made by conventional methods.

FIGURES 15 and 16 show a machine according to the present invention for reinforcing a pipe of plastic or other material in a plastic state with stronger material in strip or wire or similar form. This machine is an adaptation of the first embodiment of the present invention, described with reference to FIGURES 1–6, and differs from that only in that the thread is in the outer sleeve which here rotates while the mandrel is non-rotating, and in that the thread at its deepest section does not penetrate through the pipe-wall right to the mandrel, but only to the depth at which the reinforcement is to be placed.

The machine can be used independently on existing pipes, or as an attachment to machinery making pipes for example according to the first embodiment, or as an attachment to any pipe-making machinery, for example an extruder.

In FIGURES 15 and 16, 93 is a cylindrical mandrel on which moves pipe 92 from extruder 91, 94 is a rotating ring-tool in which the four-start helical thread 98 starts very smoothly from the cylindrical surface 97 at the entry, and in the expanding section "A" gradually increases in radial depth to both sides of the original cylindrical surface, for the purpose of kneading the gradually deepening grooves 99 into the moving plastic pipe 92, and to make the plastic displaced mount up, layer by layer, into the increasing helical ridges 100 between the grooves 99. In this operation the material is peeled off layer by thin layer and is piled up into the ridges layer by layer while being heated (if necessary) from the heater 98—99, and being worked under increased compression forces which vary in direction and magnitude according to the different forms of the helical threads which the plastic passes through, as already explained with reference to FIGURES 1–6. At the deepest indentation 101, the reinforcement 102 which is only diagrammatically indicated, is introduced through channel 104 with the uniform tension and into the precise position required by design of the reinforced structure, by guide-provision 105—106. In the following section B of the tool, the helical thread 98 gradually reduces back from both sides to the cylindrical end-surface 97. Thereby the material which in section A has been peeled off layer by layer to form grooves 99, has been piled up into the ridges 100 and has been worked under compression, is in section B unwound layer by layer under increasing pressure and temperature, to produce uniform and good bond with the reinforcement 102 and a perfect seal over the reinforcement, of plastic of homogenized and strengthened quality, as already described with reference to FIGURES 1–6, having eliminated in the plastic treated the weak spots which otherwise limit the total strength of the pipe.

FIGURE 14 shows an example of apparatus according to the present invention for stretching a pipe-layer or pipe in the circumferential as well as, if required, the axial direction.

On FIGURE 14, a mandrel 80 is formed with an expanding part 82 leading into a cylindrical section 83 of enlarged diameter. The mandrel is surrounded by sleeve 84, rotatably mounted at 85 and driven by gearing means 86. The rotating sleeve has internally the shallow helical thread 87, starting from small radial depth and increasing in pitch circle diameter and also in pitch along the length, to transport the pipe-layer 81 through the expander, to work and expand the pipe-layer circumferentially and on account of the increasing pitch, also axially, the extensions being integrals of continuously occurring differential extensions.

This apparatus may be applied combined with the embodiments described, or with conventional apparatus, to stretch, work and draw and thus strengthen pipes and pipe-layers, particularly for layers to be made into mult-layer pipes.

FIGURE 17 shows a machine according to this invention for making a reinforced pipe of plastic or other material in the plastic state in the form of preformed strip and reinforcement wound together, this machine being an adaptation of the second embodiment of the invention, already described with reference to FIGURES 7, 8 and 9. The construction and operation of the device will be understood with reference to the description of FIGURE 7, like numerals representing like parts. The difference here lies in the introduction by the winding mechanism of the reinforcement 111, at the same time as winding the preformed strip, the strip being formed, as for example in the substantial Z-cross-section shown, to receive the reinforcement in a cavity formed between adjacent strips.

FIGURE 18 shows an alternative example of strip preformed with the reinforcement already in it, say by some process similar to that of covering cables, which is then made up into the reinforced pipe from one or multi-start helical strip.

It will be understood that pipes comprising several layers of differently oriented helices to withstand different types of prevailing stress, can be made according to this invention, by providing as many units as there are to be layers to wind further layers onto the preceding ones acting as a mandrel. Also pipes made up of layers of which some are reinforced and others are strengthened layers as made by the machinery of the examples FIGURES 7 to 14 can be made, and the like.

It will further be understood that the foregoing description is by way of example only, and that many more examples of the present invention may be carried out within the scope of the appended claims.

I claim:

1. In and for an apparatus for making continuously a strengthened pipe from preformed drawable material, a first component, a second component surrounding the said first component, the said components having operating surfaces facing one another and defining a substantially annular passage between them, an induction-means for introducing the said material, at least in part in the shape of a strip-element, at one end of the said passage and for arranging the said strip-elements helically in the said passage, an outlet means at the other end of the said passage, a means for rotating one of the said components about an axis central to the said passage, the said other component being non-rotatable, the said rotatable component having on its operative surface a helical thread with a radial clearance between its tip and the facing operating surface of the said non-rotating component, for working and transporting the said material along the said passage; the said thread comprising a main section in which the mean radial depth of the said passage and the radial depth of the said thread continuously decrease along the direction of transport and in which the said radial clearance continuously increases in the direction of transport; for combining adjacent side-surfaces of the said strip-element continuously in the radial and circumferential directions.

2. Apparatus as claimed in claim 1, in which the radial depth of the said helical thread in the said main section reduces continuously to zero.

3. Apparatus as claimed in claim 1, for making continuously a strengthened pipe from preformed drawable material in the shape of a pipe, in which the said induction means comprises a section of the said helical thread preceding the said main section, in which the radial depth of the said helical thread increases continuously from zero value to a maximum along the direction of transport, and the said radial clearance decreases from a maximum to a minimum value.

4. Apparatus as claimed in claim 1, for making a strengthened pipe from preformed drawable material in the shape of a pipe, in which the said induction means comprises a section of the said thread preceding the said main section, in which the radial depth of the said helical thread increases continuously from zero value to a maximum along the direction of transport, and the said radial clearance decreases from a maximum to a minimum value, the said rotatable component further comprising a channel ending at the tip of a thread of predetermined radial depth, and means for continuously introducing through the said channel into the said annular passage an elongated and windable reinforcement, for being incorporated in helical arrangement at a predetermined depth in the wall of the said strengthened pipe.

5. Apparatus as claimed in claim 1, for making continuously a strengthened pipe from preformed drawable material in the shape of drawn strip, in which the said induction means comprises a guide-means mounted on the said rotatable component for feeding the said strip into the said helical thread in the said annular passage.

6. Apparatus as claimed in claim 1, for making continuously a strengthened pipe from preformed drawable material in the shape of drawn strip, in which the said induction means comprises a guide-means rotatable with the said rotatable component, for feeding the said strip into the said helical thread in the said annular passage, and in which the said helical thread consists, at least in part, of thin sheet tipped by a knife-edge.

7. Apparatus as claimed in claim 1, for making continuously a strengthened pipe from preformed drawable material in the shape of drawn strip, in which the said induction means comprises a guide-means rotatable with the said rotatable component for feeding the said strip into the said helical thread in the said annular passage, and in which the said helical thread consists, at least in part, of thin sheet tipped by a knife-edge, the said induction means further comprising means for preheating at least the side-surfaces of the said strip, the said preheating means comprising a rotary member, means for rotating the said rotary member, friction discs mounted on the said rotary member, means for rotating the said discs with the said rotary member and permitting axial movement of the said discs on the said rotary member, means for providing an elastic pressure on the said discs towards one another and means for passing the said strip between the said discs under pressure at least at its side-surfaces.

8. Apparatus as claimed in claim 1, for making continuously a strengthened pipe from preformed drawable material in the shape of drawn strip, in which the said induction means comprises a guide-means rotatable with the said rotatable component for feeding the said strip into the said helical thread in the said annular passage, and in which the said induction-means further comprises means for preheating at least the side-surfaces of the said strip; the said preheating means comprising a rotary shaft, means for rotating the said shaft with the said rotatable component, an elastic helical rubbing sheet, a mounting for the said sheet on the said shaft for rotating the said sheet with the said shaft and for permitting axial movement thereof relative to the said shaft, means for applying an elastic pressure in opposite axial directions on the ends of the said helical sheet, for the said strip to pass through the helical thread formed by the said sheet under axial pressure at its side-surfaces, and a means for adjusting the said axial pressure.

9. Apparatus as claimed in claim 1, for making continuously a strengthened pipe of at least two layers of drawable material, comprising one apparatus as claimed in claim 1 for making one layer of pipe, and at least a second apparatus as claimed in claim 1 adjacent the said first apparatus, for making a second layer of strengthened pipe from preformed drawable material in the shape of drawn strip, the said second apparatus providing a helical arrangement of strips which is different from the helical arrangement of the strip-elements making up the said first layer of pipe, the said second apparatus winding the said strip onto the said first layer formed by the said first apparatus.

10. Apparatus as claimed in claim 1, for making continuously a strengthened pipe from preformed drawable material in the shape of drawn strip, in which the said induction means comprises a guide-means mounted on the said rotatable component, for feeding the said strip into the said helical thread in the said annular passage, and a second guide-means for feeding an elongated and windable reinforcement into the space between adjacent side-surfaces of windings of said strip, the cross-sectional shape of the said strip comprising a recess for taking up the said reinforcement.

11. Apparatus as claimed in claim 1, in which the said non-rotating component comprises longitudinal ribs near the end of the said main section, the said ribs extending into the said annular passage to prevent twisting of the strengthened pipe.

12. In and for an apparatus for making continuously a strengthened pipe from preformed drawable material, a mandrel, a sleeve surrounding the said mandrel for at least a part of its length, the said sleeve and said mandrel having operative surfaces facing one another and defining a substantially annular passage between them, an induction means for introducing the said material, at least in part in the shape of a strip-element, at one end of the said passage and for arranging the said strip-element helically in the said passage, an outlet means at the other end of the said passage, a means for rotating one of the said components about an axis central to the said passage, the said other component being non-rotatable, the said rotatable component having on its operative surface a helical thread with a radial clearance between its tip and the facing operative surface of the said non-rotating component, for working and transporting the said material along the said passage; the said helical thread comprising a main section in which the mean radial depth of the said passage and the radial depth of the said thread continuously decrease along the direction of transport and in which the said radial clearance continuously increases in the direction of transport.

13. In and for an apparatus for making continuously a strengthened pipe from preformed drawable material in the shape of a pipe, a mandrel, a sleeve surrounding the said mandrel for at least a part of its length, the said sleeve and the said mandrel having operative surfaces facing one another and defining a substantially annular passage between them, the said passage having an entry-opening at one end and an exit-opening at the other end, a means for rotating one of the said components about an axis central to the said passage, the said other component being non-rotatable, the said rotatable component having on its operative surface a helical thread with a radial clearance between its tip and the facing operative surface of the said non-rotatable component, the said helical thread comprising at least two sections along the direction of transport, a first section in which the radial depth of the said thread increases continuously from zero to a maximum value and in which the radial clearance decreases continuously from a maximum to a minimum value; and a second section in which the radial depth of the said thread decreases continuously from a maximum value to zero and the mean radial depth of the said passage decreases continuously, and the said radial clearance increases continuously from a minimum to a maximum along the direction of transport.

References Cited in the file of this patent

UNITED STATES PATENTS

| | | |
|---|---|---|
| 121,166 | Griffin | Nov. 21, 1871 |
| 1,146,477 | Cole et al. | July 13, 1915 |
| 1,445,724 | Skorkovsky | Feb. 20, 1923 |
| 1,648,475 | Darwin | Nov. 8, 1927 |
| 1,781,074 | Norton | Nov. 11, 1930 |
| 2,034,731 | Saalbach | Mar. 24, 1936 |
| 2,078,565 | Durst et al. | Apr. 27, 1937 |
| 2,169,315 | Yngve | Aug. 15, 1939 |
| 2,193,040 | Porter | Mar. 12, 1940 |
| 2,225,026 | Welsh | Dec. 17, 1940 |
| 2,384,521 | Andersen et al. | Sept. 11, 1945 |
| 2,556,276 | Henning | June 12, 1951 |
| 2,608,720 | Meissner | Sept. 2, 1952 |
| 2,617,167 | Johnson | Nov. 11, 1952 |
| 2,676,356 | Becker | Apr. 27, 1954 |
| 2,744,287 | Parshall et al. | May 8, 1956 |
| 2,752,633 | Weitzel | July 3, 1956 |
| 2,770,837 | Reifenhauser | Nov. 20, 1956 |

FOREIGN PATENTS

| | | |
|---|---|---|
| 618,536 | Great Britain | Feb. 23, 1949 |